United States Patent
Leung

(10) Patent No.: US 8,579,170 B1
(45) Date of Patent: *Nov. 12, 2013

(54) AIR-BREATHING BATTERY BACKPACK FRAME

(75) Inventor: Fee Chan Leung, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,524

(22) Filed: Jan. 26, 2012

Related U.S. Application Data

(63) Continuation of application No. 12/220,395, filed on Jul. 8, 2008, now Pat. No. 8,104,653.

(51) Int. Cl.
*A45F 3/10* (2006.01)
*H02J 7/00* (2006.01)

(52) U.S. Cl.
USPC ........ 224/576; 224/148.2; 224/633; 224/636; 224/905; 320/101; 320/115

(58) Field of Classification Search
USPC ............... 224/148.2, 576, 633, 636, 905; 320/101, 109, 115; 441/88; 440/77, 440/88 A
See application file for complete search history.

(56) References Cited

U.S. PATENT DOCUMENTS

| | | | | | |
|---|---|---|---|---|---|
| 3,246,644 | A | * | 4/1966 | Peterson | 126/344 |
| 4,189,075 | A | * | 2/1980 | Hall | 224/148.2 |
| 5,381,936 | A | * | 1/1995 | Beery et al. | 224/153 |
| 6,024,264 | A | * | 2/2000 | Java | 224/576 |
| 6,464,742 | B1 | * | 10/2002 | Leung et al. | 55/385.4 |
| 7,150,667 | B1 | * | 12/2006 | Leung | 441/89 |
| 7,437,796 | B2 | * | 10/2008 | Rappin | 15/327.5 |
| 8,104,653 | B1 | * | 1/2012 | Leung | 224/576 |
| 2007/0119455 | A1 | * | 5/2007 | Schipper et al. | 128/205.22 |
| 2008/0210728 | A1 | * | 9/2008 | Bihn | 224/576 |

* cited by examiner

*Primary Examiner* — Justin Larson
*Assistant Examiner* — John Cogill
(74) *Attorney, Agent, or Firm* — Azza Jayaprakash

(57) ABSTRACT

An air breathing battery apparatus is connected to the hollow tubing of a backpack frame to provide an uninterrupted, water-resistant, light-weight power supply during extended remote operations in the field. Air breathing power sources are connected to the hollow tubes of the backpack assembly to provide a constant uninterrupted air supply in a relatively small package that fits easily into the backpack frame with only negligible added weight. The positioning of the air breathing power source in a backpack composed of hollow tubing also protects the battery from inclement weather or when the user is in water, for example, while fording a river or stream, to permit the uninterrupted use of the electronics powered by the battery.

20 Claims, 3 Drawing Sheets

AIR-BREATHING BATTERY BACKPACK FRAME

CROSS-REFERENCE TO RELATED APPLICATIONS

This application is a Continuation of U.S. patent application Ser. No. 12/220,395, which was filed on Jul. 8, 2008, and which issued on Jan. 31, 2012 as U.S. Pat. No. 8,104,653 B1. This Continuation is being filed under 35 U.S.C. Section 120, and priority from that previous application is hereby claimed, and that application is incorporated herein by reference in its entirety.

GOVERNMENT INTEREST

The invention described herein may be manufactured, used, and licensed by or for the Government without the payment to me of any royalty thereon.

FIELD OF THE INVENTION

This invention relates to portable power supplies. More specifically, the present invention relates to a novel air-breathing battery backpack frame for powering man-worn electronics in remote locations.

BACKGROUND OF THE INVENTION

Portable power sources that can operate man-worn electronics for military and law enforcement purposes are well known. For example, soldiers can carry lithium batteries to power man-worn electronics that operate for extended time periods during deployment under dangerous conditions. Frequently, the military or law enforcement user may require as much as 72 hours of continuous battery operation before resupply of power is needed. The air breathing battery, also known as air recovery, air assisted or air restored battery, is a battery in which the battery cathode is recharged by air. It can also be used to provide electrical power for man-worn electronics. Air breathing batteries could also be used to recharge other batteries for handheld devices and other electronic equipment. Those skilled in the art will readily appreciate that air breathing batteries could readily provide as much as 250 watt-hours of energy per pound of battery versus only 80 watt-hours of energy per pound for current military lithium batteries.

However, current air breathing batteries suffer from a number of disadvantages, shortcomings, and limitations that have made them unsuitable for some purposes during extended deployment in remote locations by military or law enforcement personnel. One significant difficulty with the air breathing battery is the requirement that they be exposed to ambient air in order to operate. This means that the air-breathing battery cannot operate man-worn electronics if the user becomes immersed in water during a rain storm or water fording operations. This also means that they can become inoperable if they are stored or packed away for long periods of time.

Another difficulty with any equipment that is worn by the combat soldier; police officer or recreational camper is the need for the equipment to be light-weight and durable so that the user is not easily fatigued, burdened, or slowed down because of an extensive load of equipment. FIG. 1 illustrates one example of the standard military backpack frame known as the All-Purpose Lightweight Individual Carrying Equipment, or ALICE, which was introduced into United States Army service in 1974. This backpack frame also features a folding shelf that can support the bottom of the backpack during operations. The FIG. 1 backpack frame is composed of light-weight hollow tubes that are configured into a frame that can readily fit onto the soldier's back with the aid of straps, not shown in this drawing.

The backpack frame and any other infantry outdoor equipment is that the equipment must be light-weight, durable, and mission-ready so that the soldier can also carry the more essential firearms and ammunition needed to complete any given combat mission. Today's combat missions make power-hungry electronics and communications equipment part of the necessary load, but the power sources must still be as light-weight and compact as possible. Thus, there has been a long-felt need for a water-resistant, light-weight, compact power supply for soldiers, law enforcement personnel and recreational campers to carry during deployment in remote locations that is adequate to operate man-worn electronics without burdening the user with an excessive load that could jeopardize life, limb and the mission.

SUMMARY OF THE INVENTION

In order to overcome the disadvantages, shortcomings and limitations of current air breathing power systems, the present invention advantageously provides an air breathing battery structure that is incorporated into a standard military backpack frame with a negligible weight increase that will provide the deployed user with a water-resistant, light-weight, and extended power supply during remote field operations. In accordance with the present invention, the air breathing power systems can be connected to the hollow tubes of a standard backpack to provide a constant uninterrupted air supply in a relatively small package that fits easily into the backpack frame with only negligible added weight. The positioning of the air breathing battery structure in a standard military backpack would also protect the battery from inclement weather or when the user is in water, for example, while fording a river or stream, to permit the uninterrupted use of the electronics powered by the battery.

Accordingly, it is an object of the present invention to provide an air breathing power source incorporated into a backpack frame.

It is another object of the present invention to provide an air breathing power source connected to the hollow tubing of a backpack frame to provide an uninterrupted, water-resistant air supply for the air breathing power source.

It is still a further object of the present invention to provide an air breathing battery apparatus connected to the hollow tubing of a backpack frame to provide an uninterrupted, water-resistant air supply for the air breathing battery apparatus.

These and other objects and advantages are provided by this invention's air breathing battery backpack frame comprising an air breathing battery connected to hollow tubes of a backpack frame that provides air passages for the air breathing battery that is not interrupted by water during rain or water-fording operations. The air breathing battery produces electrochemical energy by using oxygen straight from the air. Oxygen becomes the cathode reactant, and is diffused directly into the battery. The air cathode uses an aqueous alkaline electrolyte to catalytically promote the reaction of oxygen, but is not depleted or transformed at discharge. The cathode in an air breathing battery is compact, yet at the same time has an almost unlimited capacity, and achieves high energy densities due to the additional volume available. The anodes in these batteries are commonly available metals with high energy density like aluminum or zinc that release electrons when oxidized.

Since insufficient airflow in an air breathing battery can result in poor performance and can shorten the battery life, this invention's air breathing battery backpack frame is configured to provide an uninterrupted air supply during dangerous remote operations by having the air breathing battery draw air from the backpack frame's hollow tubes. The air breathing battery backpack frame provides a continuous air flow necessary to activate the battery and maintain its useful performance and lifetime.

The air breathing batteries are the most compact and, potentially, the least expensive batteries available and since they can also be readily connected to the hollow-tubed backpack frame, this invention's air breathing battery backpack frame can provide the soldier, police officer, first responder, or recreational camper with reliable electrical power for man-worn electronics in remote locations without the disadvantages, shortcomings, and drawbacks of cumbersome and heavy prior art battery systems.

This invention's air-breathing battery backpack frame advantageously provides air passages for the air breathing battery during remote operations, water fording operations, diverts and stores water that may enter the air vents, and allows the user to drain the backpack frame. The air breathing battery backpack frame could provide a reliable, water-resistant, and light-weight power source for man-worn electronics for soldiers, law enforcement personnel, or first responders in dangerous and remote locations. However, its compact and light-weight size also make it extremely useful for recreational campers and others that require a power source for man-worn electronics.

The present invention also contemplates an air breathing battery backpack frame system and a method for providing a continuous airflow to an air breathing battery through a backpack frame assembly.

DETAILED DESCRIPTION OF THE DRAWINGS

This invention's air breathing battery backpack frame is composed of hollow tubes shaped to the contours of the user's back, which also provides a supporting structure, air vents, and connections for a light-weight air breathing battery. In accordance with the present invention, the backpack frame not only provides a structure for mounting the air breathing battery, but also provides hollow tubes that function as a passageway for the air that is needed to activate the air breathing battery. This invention's air breathing battery backpack frame includes air intake valves located on top of the frame which then connect to the hollow tubes that bring air to the battery.

Figure 1:
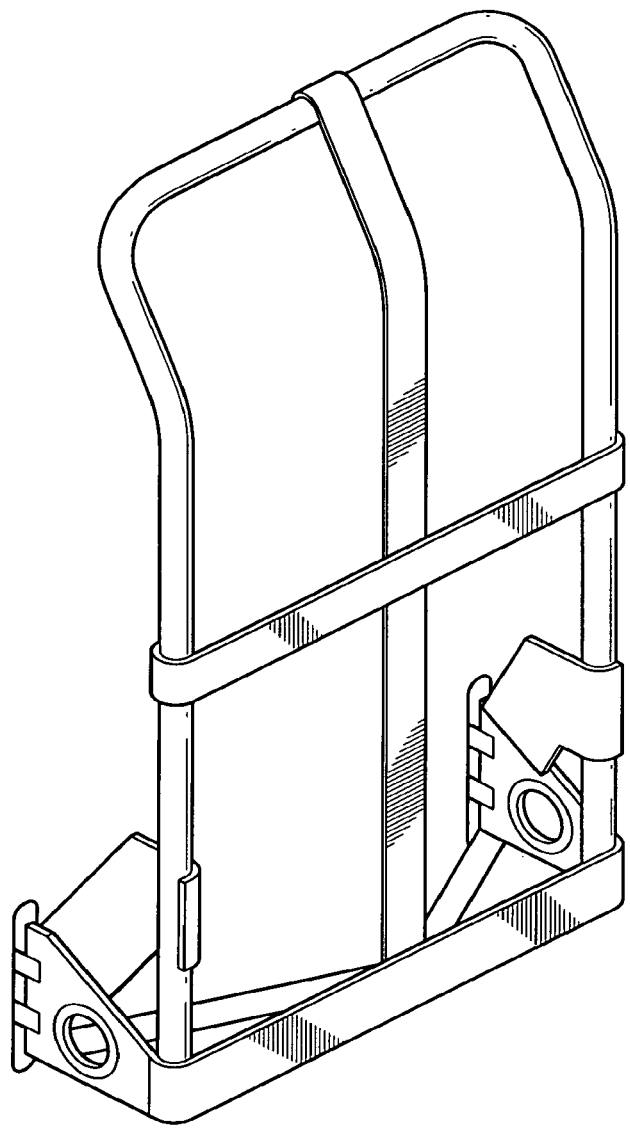
FIG. 1 is a perspective view of a prior art military backpack.
Figure 2:
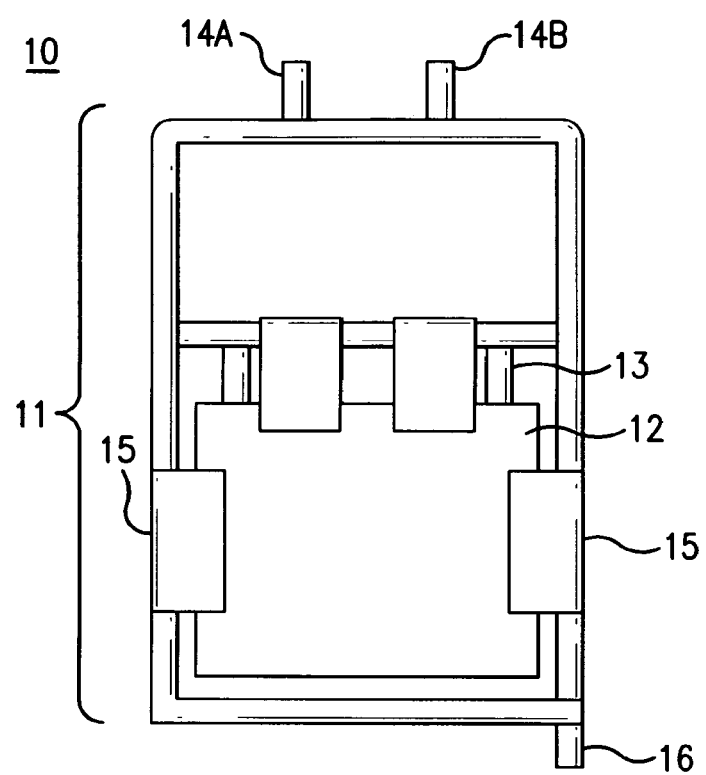
FIG. 2 is a rear view of the air breathing battery backpack frame of this invention.

Referring now to the drawings, FIG. 2 is a rear view of the air breathing battery backpack frame 10 of this invention, comprising the hollow-tubed frame assembly 11, air breathing battery case 12, air nozzle 13, and air intake vents 14A and 14B. In operation, air enters the backpack frame 10 at air intake vents 14A and 14B, passes through the hollow tubes of the frame assembly 11 and enters the air breathing battery case 12 through an air nozzle 13. The air breathing battery case 12 contains an air breathing battery suitable for the mission. The battery case 12 is securely mounted onto the frame assembly 11 by a means for fastening 15 such as a bracket, clasp or strap.

The angle of the air intake vents 14A and 14B is adjustable based on the water resistance requirements in a given situation. For example, during a water fording or amphibious operation, the air intake vents 14A and 14B could be bent to be vertical, which would minimize unwanted water intake due to splashing. During a rainstorm, the air intake vents 14A and 14B could be bent downwards to avoid or minimize unwanted water intake. In the event that unwanted water intake does take place, such as the soldier falling into the stream or an ocean wave splashing during an amphibious landing, the hollow-tubed frame assembly 11 will divert water away from battery case 12 and down into drain plug 16, where the water may be drained at an opportune time by the user. The air breathing battery case 12 is flat so that the backpack, not shown in this drawing, may easily fit over the battery case 12 without impeding its operations.

Figure 3:
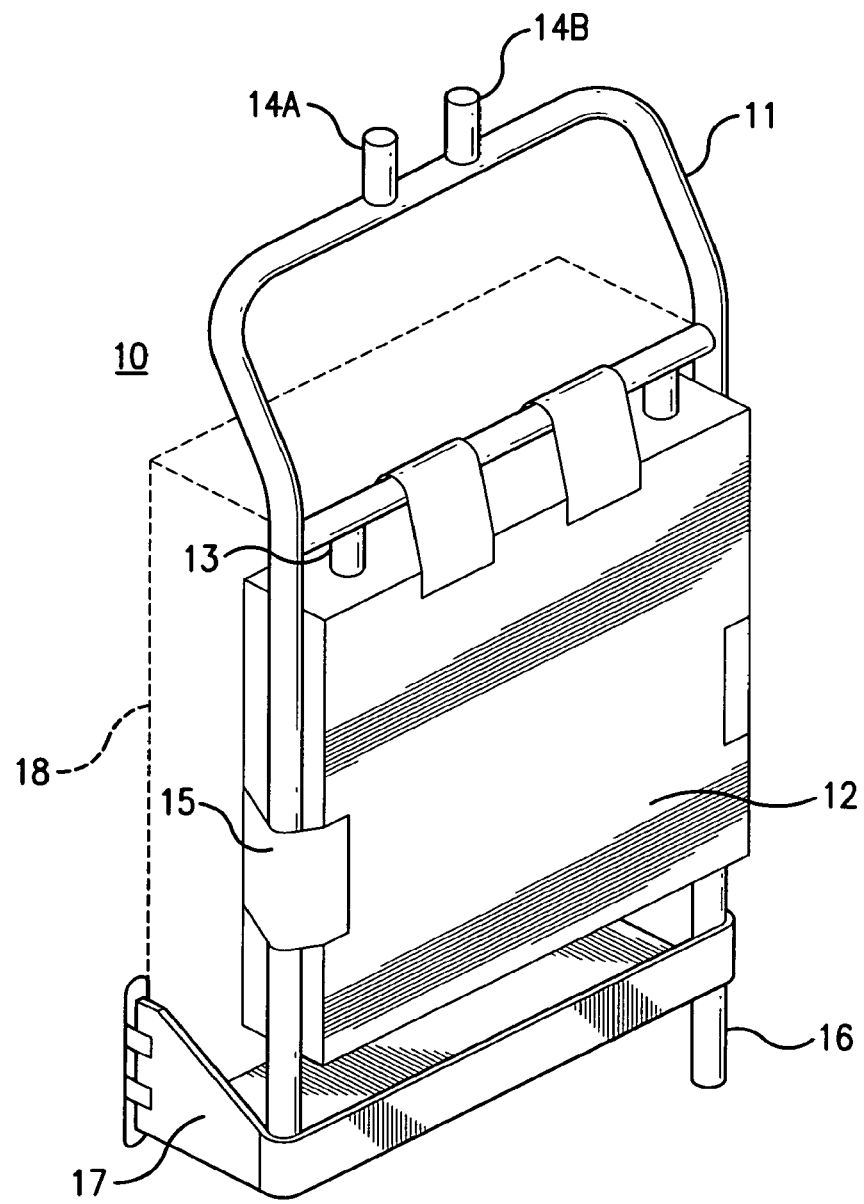
FIG. 3 is a perspective view of the air breathing battery backpack frame of this invention.

FIG. 3 is a perspective view of the air breathing battery backpack frame 10 of this invention, where the same numerals are employed or like structures, showing a shelf 17 that supports a backpack, which is represented by broken lines 18. Only straps are required for the user to carry the loaded backpack frame 10.

A number of variations to the air breathing battery backpack frame are considered to be within the contemplation of this invention, including making the air breathing battery case flat, making the air intake vents 14A and 14B flexibly adjustable to minimize unwanted water intake, the frame assembly 11 diverting unwanted water away from the air breathing battery and the fastening means 15 being a bracket. The present invention also contemplates an air breathing battery backpack frame system and many of the same variations apply to that embodiment.

The present invention also encompasses a method for providing a continuous airflow to an air breathing battery through a backpack frame assembly, comprising the steps of selecting the air breathing battery; forming an air breathing battery case; positioning the air breathing battery in the air breathing battery case; fabricating a group of hollow tubes; and forming the hollow tubes into the backpack frame assembly. The steps of the method continue with the step of connecting the air breathing battery case to the frame assembly; forming a group of air intake vents at a top portion of the frame assembly; allowing the air intake vents to communicate with a group of air nozzles; connecting the air nozzles to the air-breathing battery case; and providing the continuous airflow through the hollow tubes to the air nozzles and thence to the air breathing battery.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What I claim is:

1. An air breathing battery backpack frame device for use with an air breathing battery, comprising:
   an air breathing battery case;
   said air breathing battery case being connected to a frame assembly;
   said frame assembly being composed of a plurality of hollow tubes;

at least one air intake vent disposed at a top portion of said frame assembly provides a continuous airflow; and said continuous airflow is conducted through said hollow tubes to at least one air nozzle, said at least one air nozzle configured for communicating with the air breathing battery to provide a light-weight water-resistant power source to a user.

2. The air breathing battery backpack frame device, as recited in claim 1, further comprising said at least one air intake vent being flexibly adjustable to minimize an unwanted water intake.

3. The air breathing battery backpack frame device, as recited in claim 2, further comprising said frame assembly diverts unwanted water away from said air breathing battery.

4. The air breathing battery backpack frame device, as recited in claim 3, further comprising said air breathing battery case being flat so that a backpack can be carried on said frame assembly without interrupting said continuous airflow.

5. The air breathing battery backpack frame device, as recited in claim 4, further comprising said air breathing battery case being securely fastened to said frame assembly with a means for fastening.

6. The air breathing battery backpack frame device, as recited in claim 5, further comprising said fastening means being a bracket.

7. An air breathing battery backpack frame system for use with an air breathing battery, comprising:

an air breathing battery case;

said air breathing battery case being connected to a frame assembly;

said frame assembly being composed of a plurality of hollow tubes;

at least one air intake vent disposed at a top portion of said frame assembly provides a continuous airflow; and said continuous airflow is conducted through said hollow tubes to at least one air nozzle, said at least one air nozzle configured for communicating with the air breathing battery to provide a light-weight water-resistant power source to a user.

8. The air breathing battery backpack frame system, as recited in claim 7, further comprising said at least one air intake vent being flexibly adjustable to minimize an unwanted water intake.

9. The air breathing battery backpack frame system as recited in claim 8, further comprising said frame assembly diverts unwanted water away from said air breathing battery.

10. The air breathing battery backpack frame system, as recited in claim 9, further comprising said air breathing battery case being flat so that a backpack can be carried on said frame assembly without interrupting said continuous airflow.

11. The air breathing battery backpack frame system, as recited in claim 10, further comprising said air breathing battery case being securely fastened to said frame assembly with a means for fastening.

12. The air breathing battery backpack frame system, as recited in claim 11, further comprising said fastening means being a bracket.

13. A method for providing a continuous airflow for use with an air breathing battery through a backpack frame assembly, comprising the steps of:

forming an air breathing battery case;

configuring said air breathing battery case for positioning an air breathing battery in said air breathing battery case;

fabricating a plurality of hollow tubes;

forming said plurality of hollow tubes into said backpack frame assembly;

forming at least one air intake vent disposed at a top portion of said frame assembly;

allowing said at least one air intake vent to communicate with at least one air nozzle;

connecting said at least one air nozzle to said air breathing battery case; and providing said continuous airflow through said hollow tubes to said at least one air nozzle.

14. The method for providing continuous airflow for use with the air breathing battery through a backpack frame assembly, as recited in claim 13, further comprising the step of forming said at least one air intake vent to be flexibly adjustable to minimize an unwanted water intake.

15. The method for providing continuous airflow for use with the air breathing battery through a backpack frame assembly, as recited in claim 14, further comprising the step of forming said frame assembly to divert unwanted water away from said air breathing battery.

16. The method for providing continuous airflow for use with the air breathing battery through a backpack frame assembly, as recited in claim 15, further comprising the step of shaping said air breathing battery case to be flat so that a backpack can be carried on said frame assembly without interrupting said continuous airflow.

17. The method for providing continuous airflow for use with the air breathing battery through a backpack frame assembly, as recited in claim 16, further comprising the step of fastening said air breathing battery case to said frame assembly with a means for fastening.

18. The method for providing continuous airflow for use with the air breathing battery through a backpack frame assembly, as recited in claim 17, wherein said fastening means is a bracket.

19. The method for providing continuous airflow for use with the air breathing battery through a backpack frame assembly, as recited in claim 13, further comprising the step of forming a drain plug disposed at a bottom portion of said backpack frame assembly so as to allow water to be drained at an opportune time by the user.

20. The method for providing continuous airflow for use with the air breathing battery through a backpack frame assembly, as recited in claim 13, further comprising the step of forming a shelf disposed at a bottom portion of said frame assembly so that a backpack can be supported on said shelf without interrupting said continuous airflow.

\* \* \* \* \*